(12) United States Patent
Gibson et al.

(10) Patent No.: US 8,710,685 B2
(45) Date of Patent: Apr. 29, 2014

(54) METHODS AND SYSTEMS FOR IMPROVED ENGINE SPEED CONTROL DURING ENGINE STARTING

(71) Applicant: Ford Global Technologies, LLC, Dearborn, MI (US)

(72) Inventors: Alex O'Connor Gibson, Ann Arbor, MI (US); John Anthony DeMarco, Lake Orion, MI (US); Allan Roy Gale, Livonia, MI (US); Robert Michael Grant, Farmington Hills, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 0 days.

(21) Appl. No.: 14/066,440

(22) Filed: Oct. 29, 2013

(65) Prior Publication Data

US 2014/0055102 A1 Feb. 27, 2014

Related U.S. Application Data

(63) Continuation of application No. 12/913,569, filed on Oct. 27, 2010, now Pat. No. 8,569,903.

(51) Int. Cl.
  *F02N 11/04* (2006.01)
(52) U.S. Cl.
  USPC ....................................... 290/36 R

(58) Field of Classification Search
  USPC .............. 290/36 R, 7, 47–51; 322/11, 25, 26; 307/10.1
  See application file for complete search history.

(56) References Cited

U.S. PATENT DOCUMENTS

| | | |
|---|---|---|
| 3,124,693 A | 3/1964 | Peras |
| 3,206,610 A | 9/1965 | Lovrenich |
| 3,270,208 A | 8/1966 | Carlson |
| 3,578,981 A | 5/1971 | Lombard et al. |
| 4,301,376 A | 11/1981 | Ragaly |
| 7,042,115 B2 | 5/2006 | Mizutani et al. |
| 7,471,069 B2 | 12/2008 | Kusafuka et al. |
| 8,569,902 B2 | 10/2013 | Gibson et al. |
| 2008/0157539 A1 | 7/2008 | Tani et al. |
| 2010/0001523 A1 | 1/2010 | Sato et al. |
| 2010/0258099 A1 | 10/2010 | Andersson et al. |

FOREIGN PATENT DOCUMENTS

WO 2009118629 A1 10/2009

*Primary Examiner* — Jean F Duverne
(74) *Attorney, Agent, or Firm* — Julia Voutyras; Alleman Hall McCoy Russell & Tuttle LLP (57) ABSTRACT

A system for improving engine starting is disclosed. In one example, an engine starting is improved by providing a variable load to the engine during engine starting. The variable load may be provided by controlling alternator field current during the engine start.

20 Claims, 6 Drawing Sheets

METHODS AND SYSTEMS FOR IMPROVED ENGINE SPEED CONTROL DURING ENGINE STARTING

CROSS REFERENCE TO RELATED APPLICATIONS

The present application is a continuation of U.S. patent application Ser. No. 12/913,569, filed on Oct. 27, 2010, now U.S. Pat. No. 8,569,903, the entire contents of which are hereby incorporated by reference for all purposes.

FIELD

The present application relates to methods and systems for controlling an engine restart.

BACKGROUND AND SUMMARY

Vehicles have been developed to perform an engine stop when specific engine idle-stop conditions are met and then to automatically restart the engine when restart conditions are met. Such idle-stop systems enable fuel savings, reduced exhaust emissions, reduced vehicle noise, and the like. In some idle-stop systems, engine speed is limited during an engine restart by loading the engine via an alternator mechanically coupled to the engine. However, during engine restarting a substantial amount of current is required by a starter from a battery to start the engine. Consequently, when a higher amount of current is drawn from the battery, the battery voltage may be lowered and the mechanical load provided by the alternator to the engine may change in an unexpected and/or unpredictable manner.

Systems that attempt to limit engine speed by simply applying a substantially constant battery voltage to the alternator field coil during an engine start when the voltage of the battery is used by the starter to crank the engine have limited capabilities to control engine speed during engine starting. In particular, when a substantially constant voltage is applied to an alternator field coil, the current flow in the alternator field coil can be related to the coil impedance and the velocity of the alternator rotor rather than being controlled to a specific value. And, since the load provided by the alternator to the engine is related to the magnetic field strength of the alternator, applying a substantially constant battery voltage to an alternator field coil may not yield a desired level of alternator load control.

The inventors herein have developed a system for controlling engine speed during an engine start, comprising: an engine; a first battery in electrical communication with an engine starter during an engine start; an alternator mechanically coupled to the engine, the alternator having a field coil that is electrically buffered from the battery during an engine start, the field coil in electrical communication with a power source other than the battery during the engine start; and a circuit to vary a strength of a magnetic field produced by the field coil via adjusting field coil current.

By adjusting alternator field current supplied via a power source that is electrically buffered from the battery used to supply power to crank an engine during engine starting, it may be possible to provide different loads to the engine during different engine starting conditions so that engine starting can be improved. For example, alternator field current can be reduced at lower engine temperatures so that higher engine friction at lower engine temperatures may be compensated. Further, alternator field current can be reduced when the engine is started at higher altitudes where engine starting torque may be reduced since less air may be available to start the engine. And, since the alternator field current is supplied from a power source that is electrically buffered from the battery used to crank the engine, alternator field current control can be simplified and may be more robust.

The present description may provide several advantages. For example, the approach can offer flexible alternator field coil current control during a variety of engine operating conditions so that engine starting speed may be more consistent. Further, the approach may simplify alternator field coil current control since the field current is buffered from the battery used to start the engine. By electrically buffering the field coil power source from the battery used to start the engine, it may be possible to mitigate the effect battery voltage droop may have on alternator field control. Further still, the approach may allow alternator field strength to be adjusted according to a number of cylinder combustion events since engine start so that the alternator field can be controlled in response to engine operation rather than time. As such, the alternator field may be controlled such that alternator load can be adjusted in a more repeatable manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
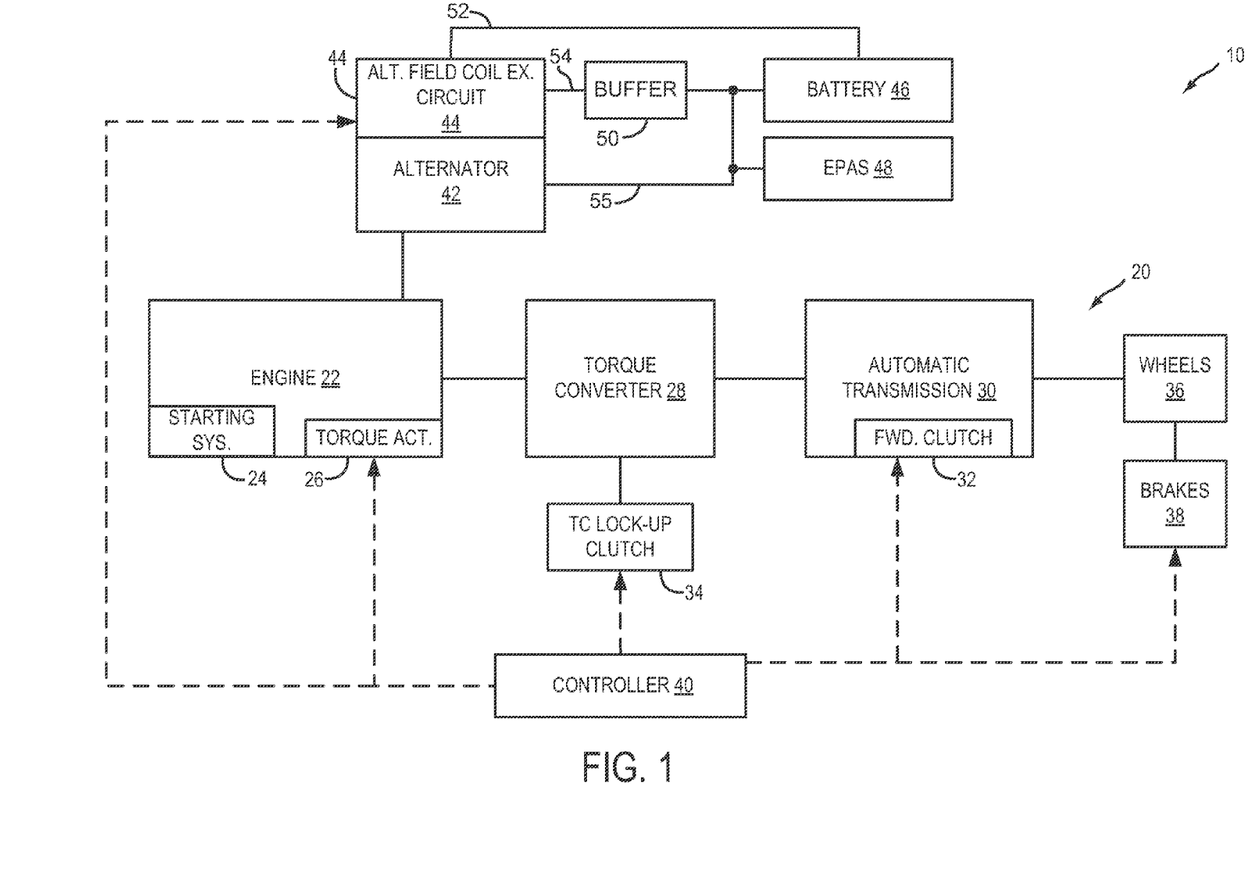
FIG. 1 shows an example vehicle system layout.

The following description relates to systems and methods for adjusting an engine load applied by an alternator, via an alternator rotor, on a vehicle engine during an engine start to control engine speed. An engine system, as shown in FIG. 1, may be configured with an alternator that is mechanically coupled to the engine. A field coil circuit of the alternator may be configured to adjust a load applied to the engine via an alternator so that engine speed can be controlled during an engine start. The engine system may further include a battery for powering an engine starter during the engine start. As shown in FIGS. 2-7, an engine electrical circuit that affects engine speed may be configured such that a field coil excitation circuit of the alternator is electrically buffered from the battery supplying power to crank the engine during the engine start. An engine controller may be configured to perform a control method, such as the method of FIG. 8, to control engine speed when a more predictable and consistent mechanical load is applied by the alternator to the engine. Alternatively, the controller may adjust a current applied to the alternator field circuit to thereby vary the mechanical load applied to the engine by the alternator based on a desired engine start speed profile. In this way, the alternator field coil excitation circuit is controlled and electrically buffered from the battery supplying power to crank the engine during a start. Consequently, degradation in alternator performance due to battery aging (or other causes of voltage droop) may be reduced. As a result, regulation of the alternator load applied to the engine may be improved. Further, control of current output by the alternator to ancillary electrical devices during an engine start may be improved.

FIG. 1 shows a block diagram layout of a vehicle system 10, including a vehicle drive-train 20. Drive-train 20 may be powered by engine 22. In one example, engine 22 may be a gasoline engine. In alternate examples, other engine configurations may be employed, for example a diesel engine. Engine 22 may be started with an engine starting system 24, including a starter. In one example, the starter may include an electrical motor. The starter may be configured to support engine restart at or below a predetermined near zero threshold speed, for example at or below 50 rpm, or 100 rpm. Torque of engine 22 may be adjusted via torque actuator 26, such as a fuel injector, throttle, camshaft, etc. Additionally, in the case of a hybrid vehicle, the powertrain may be used to slow or increase engine speed as desired.

An engine output torque may be transmitted to torque converter 28 to drive an automatic transmission 30. In some examples, the torque converter may be referred to as a component of the transmission. The output of the torque converter 28 may be controlled by torque converter lock-up clutch 34. When torque converter lock-up clutch 34 is fully disengaged, torque converter 28 transmits torque to automatic transmission 30 via fluid transfer between the torque converter turbine and torque converter impeller, thereby enabling torque multiplication. In contrast, when torque converter lock-up clutch 34 is fully engaged, the engine output torque is directly transferred via the torque converter 28 clutch to an input shaft (not shown) of transmission 30. Alternatively, the torque converter lock-up clutch 34 may be partially engaged, thereby enabling the amount of torque relayed to the transmission to be adjusted.

Torque output from the automatic transmission 30 may in turn be relayed to wheels 36 to propel the vehicle. Specifically, automatic transmission 30 may adjust an input driving torque at the input shaft (not shown) responsive to a vehicle traveling condition before transmitting an output driving torque to the wheels. For example, transmission torque may be transferred to vehicle wheels 36 by engaging one or more clutches, including forward clutch 32. As such, a plurality of such clutches may be engaged, as needed. Further, wheels 36 may be locked by engaging wheel brakes 38. In one example, wheel brakes 38 may be engaged in response to the driver pressing his foot on a brake pedal (not shown). In the same way, wheels 36 may be unlocked by disengaging wheel brakes 38 in response to the driver releasing his foot from the brake pedal.

Vehicle system components outside of the drivetrain may include an alternator 42, a battery 46, and electric power assist steering system (EPAS) 48. Additional auxiliary loads (not shown) may include lights, radio system, HVAC systems (for heating and/or cooling a vehicle cabin), etc. Alternator 42 may be configured to convert the mechanical energy generated while running engine 22 to electrical energy for storage in battery 46. Alternator 42 may include a field coil excitation circuit 44. The field coil excitation circuit 42 may be a linear or pulse width modulated voltage regulator. In one example, a voltage command from controller 40 may be compared to a voltage of a battery by the field coil excitation circuit. If the voltage command of the controller differs from the battery voltage the average voltage applied by the field coil excitation circuit to the alternator field may be increased so as to increase the field coil current. As such, when a voltage is applied to the alternator field coil excitation circuit 42, the coil is at least partially energized, and accordingly a load is applied on the engine 22. Battery voltage may be sensed via electrical connection 52. The rotating engine 22, mechanically coupled to the alternator, causes current to flow in the stator of alternator 42 through connection 55 to the battery.

In one example, as depicted, engine 22 may be configured to be selectively (and automatically) shut down when idle-stop conditions are met and restarted when restart conditions are met. One or more auxiliary loads may be maintained, for example, at 12V, even when the engine is off. The power to maintain the auxiliary loads operational when the engine is shut down may be provided, at least in part, by battery 46 and/or buffer 50. Buffer 50 may be comprised of one or more additional batteries (e.g., one or more additional smaller batteries), and/or a DC/DC converter. Electrical connection 54 electrically couples voltage output from buffer 50 to alternator field coil excitation circuit 44. In one example, a DC/DC converter based device, such as a voltage quality module (VQM) or a voltage stability module (VSM) may be configured to provide a regulated DC voltage output from a DC voltage input (or power source), such as battery 46. The output of the DC/DC converter may be applied to the various auxiliary loads including the alternator field coil excitation circuit and alternator field coil.

As elaborated in FIGS. 2-6, the field coil excitation circuit 44 and alternator field coil of alternator 42 may be electrically buffered from battery 46 by a buffer, a DC/DC converter (or DC/DC converter based device) for example, configured to output a regulated voltage. In other examples, the field coil excitation circuit 44 and alternator field may be buffered from the battery used to start the engine via an alternative buffer (e.g., a diode). By buffering the alternator field coil excitation circuit and alternator field coil from the battery during engine starting, control of the alternator magnetic field may be improved during engine starting. Further, by improving control of alternator magnetic field, a more predictable and consistent mechanical load may be applied to engine via the alternator during an engine start. The circuits of FIGS. 2-6 provide example buffered alternator field voltage control for an alternator field coil while the circuit of FIG. 7 provides for adjusting current to the alternator field coil in response to additional engine and vehicle conditions. As elaborated in FIG. 8, a controller 40 may be configured to vary a voltage or current applied to the alternator field coil to thereby adjust the mechanical load applied to the engine via the alternator during the engine start. By varying the alternator field voltage or current, it is possible to change the load that the alternator applies to the engine during a start so that alternator load can be varied according to control parameters that are not strictly dependant on engine speed. For example, alternator field voltage or current can be adjusted to compensate for engine friction that is related to engine temperature. Alternatively, the controller 40 can provide a predictable consistent amount of mechanical load on the engine by substantially maintaining a constant voltage to the alternator field coil circuit. However, it should be noted that field current and load provided by the alternator to the engine are not constant when a constant voltage is applied to the alternator field. Rather, when a constant voltage is applied to the alternator field coil the alternator field current changes with the angular velocity of the rotor. Thus, although the load provided by the alternator to the engine varies with engine speed, the load provided by the alternator has a load profile that may be more consistent from start to start.

Controller 40 may be configured to receive inputs from engine 22 and accordingly adjust a mechanical load applied to the engine via the alternator by adjusting voltage or current supplied to the alternator field coil. As one example, an engine start speed profile may be selected, and the controller may adjust a voltage or current supplied to the alternator field coil based on a difference between actual engine speed and a desired engine speed profile. By adjusting the field coil voltage or current an intensity of a magnetic field produced by the field coil in the alternator rotor can be adjusted so that it becomes more or less difficult to rotate the rotor of the alternator. In this way, it is possible to adjust a load applied to an engine via an alternator mechanically coupled to the engine during engine starting so that engine speed can be controlled to a desired engine speed.

Controller 40 may also adjust an engine torque output by adjusting a combination of spark timing, fuel pulse width, fuel pulse timing, and/or air charge, by controlling throttle opening and/or valve timing, valve lift and boost for turbo- or super-charged engines. In the case of a diesel engine, controller 40 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied (e.g., when the vehicle is idling and engine operating parameters are within a desired range), controller 40 may selectively shut down the engine, for example, by controlling operation of drivetrain and/or accessory components. Similarly, when engine restart conditions are met, such as when the vehicle is already in an idle-stop and one or more engine operating parameters are outside the desired range, controller 40 may selectively restart the engine by powering the starter using a battery. Further, controller 40 may use engine torque actuators along with making adjustments to current supplied to an alternator field coil to control engine speed during engine starting. By controlling engine torque actuators and the load applied to the engine via the alternator it may be possible to reduce engine speed flares during engine starting.

FIGS. 2-7 depict examples of an engine starting systems that may be used to control a mechanical load applied on an engine via an alternator during an engine start. It will be appreciated that like referenced characters designate identical or corresponding components and units throughout the several examples.

Figure 2:
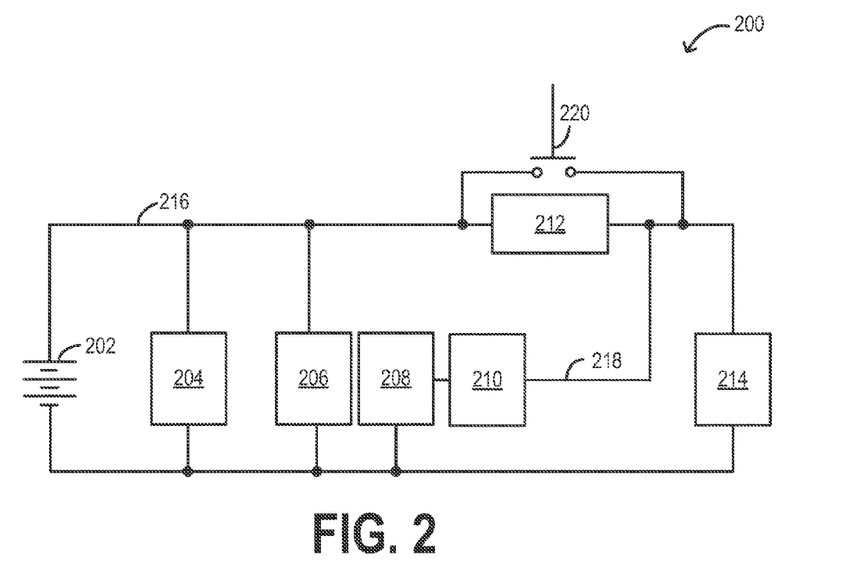
FIGS. 2-7 show examples of an engine electrical control circuits.
Figure 3:
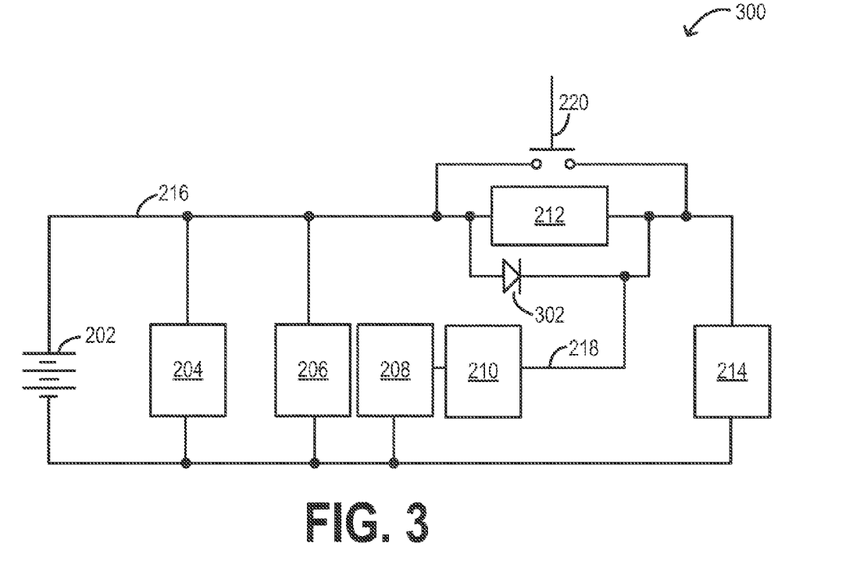

FIG. 2 depicts a first example 200 of an engine starting system including a first battery 202 in electrical communication with an engine starter 204 via electrical connector 216 during an engine start. Specifically, starter 204 is powered by first battery 202 during the engine start. An alternator 206 may be mechanically coupled to an engine that is selectively shut-down during engine idle-stop conditions (such as engine 22 of FIG. 1). Armature windings of a stator of alternator 206 may be in electrical communication with battery 202. Alternator 206 also has an alternator field coil 208 integrated with the alternator rotor. Alternator field coil 208 is supplied power via alternator field coil excitation circuit 210. In one example, alternator field coil excitation circuit is a variable voltage controller that provides a variable average voltage to alternator field coil 208 by adjusting a pulse width of a voltage applied to the input of alternator field coil excitation circuit 210. In an alternative example, alternator field coil excitation circuit is a linear variable voltage controller. In one example, the alternator field coil excitation circuit may be commanded by a controller external of the alternator (e.g., controller 40 of FIG. 1) to regulate the alternator field voltage such that a desired engine load is achieved. For example, the actual battery voltage may be compared to the commanded voltage by subtracting the actual battery voltage from the commanded battery voltage. If the comparison results in a value other than zero, the alternator filed coil excitation circuit may adjust the pulse width of voltage applied from DC/DC converter 212 to the alternator field coil. Alternator field coil excitation circuit 210 may be in electrical communication via electrical connection 218 with a power source other than first battery 202 during the engine start. In one example, as depicted in the examples of FIGS. 2 and 3, the power source is DC/DC converter 212, or a DC/DC converter based device that is configured to electrically buffer the alternator field coil and alternator field coil excitation circuit from the first battery during the engine start. The engine starting system may further include a switch 220, or relay, coupled in parallel to the power source (e.g., in parallel to DC/DC converter 212 in the examples of FIGS. 2-3) or buffer. A control system, such as the controller 40 of FIG. 1, may include instructions for opening switch 220 during the engine start to buffer alternator field coil excitation circuit 210 and alternator field coil 208 from battery 202 via DC/DC converter or an alternative device. Following the engine restart, the controller may close switch 220 to electrically bypass the buffer circuitry (e.g. 212) and directly electrically couple the alternator field coil excitation circuit to the battery that provided power to the starter. Alternatively, the alternator field coil excitation circuit can be electrically coupled to the output of the alternator (e.g., the armature windings of the alternator stator) following engine starting. In one example, after a voltage at an input of DC/DC converter 212 exceeds a threshold voltage, or after a predetermined amount of time after the engine speed reaches a threshold engine speed, a controller may close switch 220. As such, when switch 220 is open, the field coil circuit excitation circuit 210 and alternator field coil 208 are electrically buffered from first battery 202.

DC/DC converter 212 may be further electrically coupled to one or more auxiliary electrical loads 214. One or more of the auxiliary loads may be maintained at 12V or another desired voltage even when the engine is selectively shut down. In one example, auxiliary electrical loads 214 may include interior vehicle lighting. In another example, auxiliary electrical loads 214 may include an electric power assist steering system (EPAS). When an EPAS is included, the controller may be further configured to maintain a current applied on the power steering system by the DC/DC converter during the engine start, to thereby improve power steering assist response times. In an alternative example, EPAS may be electrically coupled to the output of the alternator armature windings of the alternator stator. Since control of the alternator field current is improved by supplying buffered voltage and/or current to the alternator field coil excitation circuit and alternator field coil via the DC/DC converter, voltage output from the alternator armature windings of the armature stator to the EPAS is improved. Consequently, EPAS performance may be improved.

FIG. 3 shows a second example 300 of an engine starting system further comprising a diode 302 in the circuit that electrically buffers the first battery 202 from the alternator field coil 208 and the alternator field coil excitation circuit 210. The cathode of diode 302 is oriented towards alternator field coil excitation circuit 210, and the anode of diode 302 is oriented towards first battery 202. As such, diode 302 limits current flow from the output of DC/DC converter 210 to first battery 202. The added diode 302 may be used to backup the operation of switch 220 in the event of degradation of switch 220. For example, if switch 220 does not close when battery voltage is greater than the voltage output by DC/DC converter 212, diode 302 begins to conduct in a forward direction and current flows from battery 202 and the armature windings of the stator of alternator 206 to alternator field coil excitation circuit 210 and electrical loads 214. In this way, diode 302 electrically buffers the alternator field coil excitation circuit 210 and alternator field coil 208 from the first battery 202 via limiting current flow in a direction from the field coil excitation circuit 210 to the first battery 202.

Figure 4:
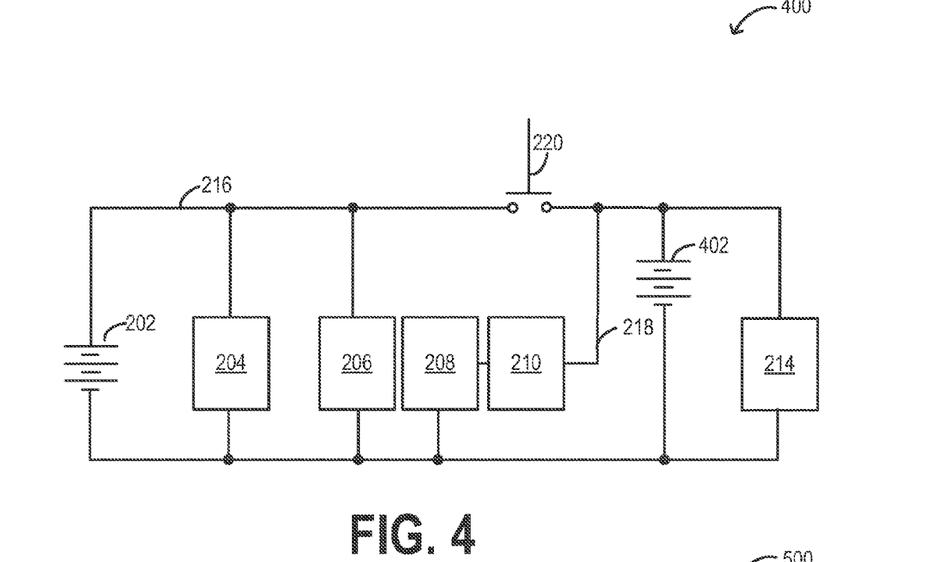
Figure 5:
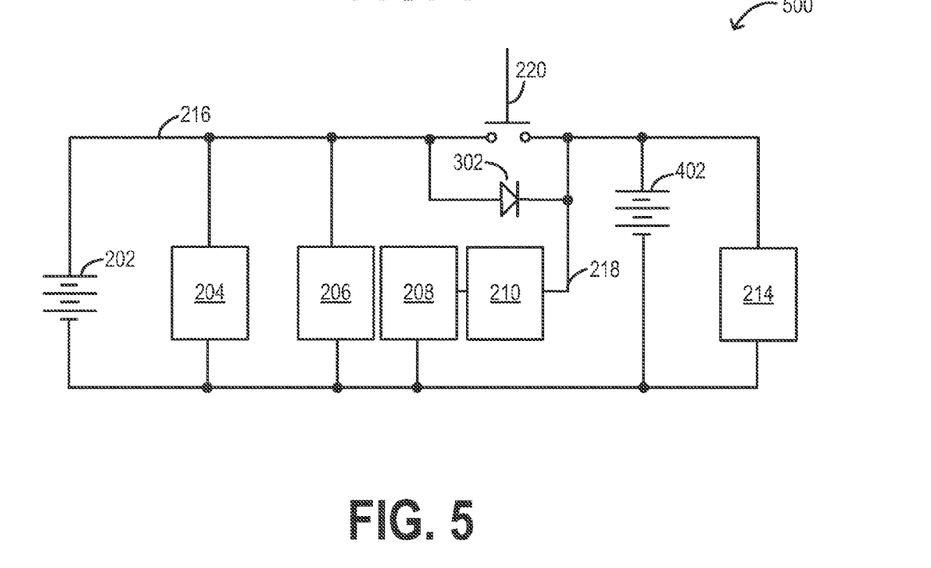

FIGS. 4 and 5 show respective examples 400 and 500 of an engine starting system wherein the power source supplying voltage and current to the alternator field coil excitation circuit 210 during an engine start is a second battery 402. Specifically, the example circuit of FIG. 4 is substantially similar to the example circuit of FIG. 2 except that the power source to alternator field coil excitation circuit 210 and auxiliary electrical loads 214 is second battery 402 in lieu of DC/DC converter 210. Further, the second battery 402 does not receive charge from the first battery during engine starting as does the DC/DC convertor 212 of FIG. 2. Similarly, the example of FIG. 5 is substantially similar to the example of FIG. 3 except that the power source to alternator field coil excitation circuit 210 and auxiliary electrical loads 214 is second battery 402 in lieu of DC/DC converter 212. Further, the second battery 402 does not receive charge from the first battery during engine starting as does the DC/DC convertor 212 of FIG. 3. As shown, the example of FIG. 5 includes an added diode 302 that may be used to backup operation of switch 220 in the event of degradation of switch 220. As such, in the examples of FIGS. 4-5, a substantially constant voltage output is supplied to the alternator field coil excitation circuit by second battery 402.

It will be appreciated that while the depicted examples illustrate a starter 204 coupled to the battery, in alternate examples, other non-VQM loads such as the fuel pump, seat motors, and window defroster may be additionally included.

The circuits of FIGS. 2-5 can provide more repeatable and consistent alternator loads to an engine during starting. However, it may be desirable under some conditions to control alternator field current via adjusting voltage applied by alternator field coil.

For example, it may be desirable during an engine start to adjust alternator field current in response to engine speed or according to a predefined profile rather than adjusting field voltage in response to a difference between a commanded battery voltage and an actual battery voltage.

Figure 6:
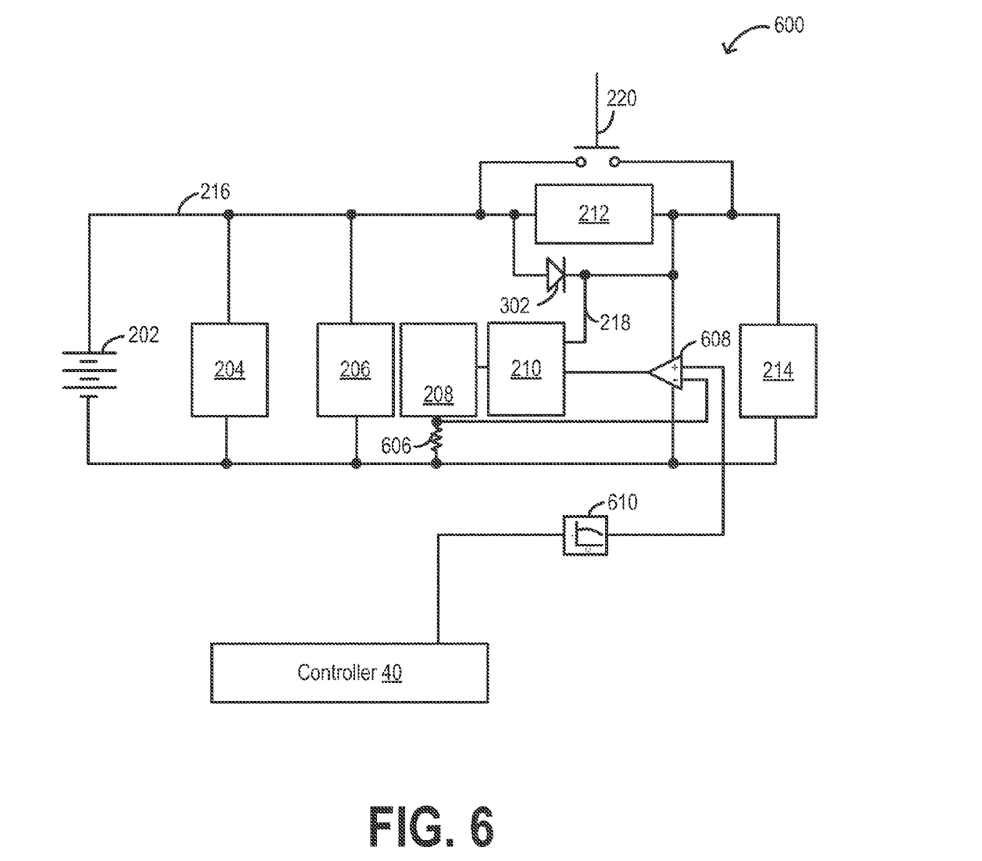
Figure 7:
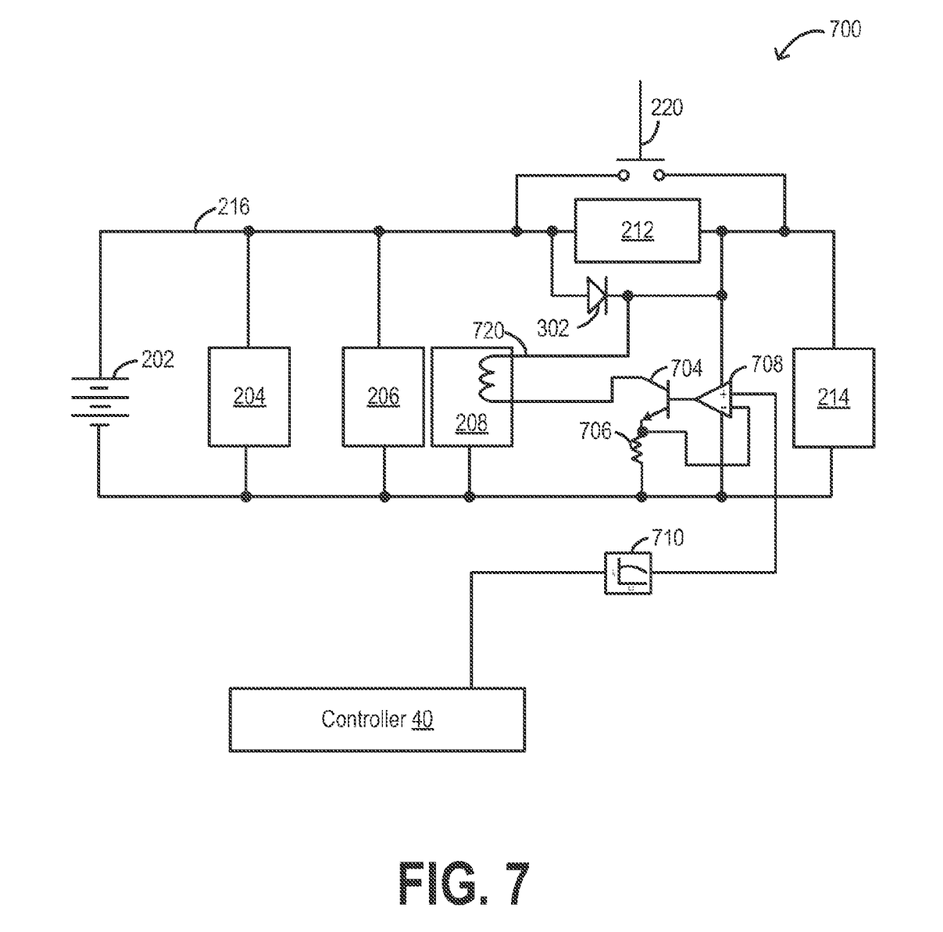

Now turning to FIG. 6, it shows yet another example circuit 600 for an engine starting system. Herein, in addition to the components previously introduced in FIGS. 2-5, the system may include a differential amplifier 608 to adjust alternator field current via alternator field coil excitation circuit 210. By varying the average voltage applied to the alternator field coil it is possible to alter the alternator field current and vary the strength of a magnetic field produced by alternator field coil 208.

In the depicted example, differential amplifier 608 receives a voltage from controller 40 via transfer function 610 which relates alternator field current to a voltage command. In one example, a desired alternator torque load is converted to a desired alternator field current and output to differential amplifier 608 as a voltage. Differential amplifier 608 may be powered by a power source other than first battery 202. For example, differential amplifier 608 may be powered by DC/DC converter 212 or by a second battery 402 (as shown in the examples of FIGS. 4-5). By varying the current flow through the alternator field coil 208 via the alternator field coil excitation circuit during an engine start, the mechanical load provided by the alternator to the engine during the engine start may be varied. For example, to achieve a desired engine start speed profile 610, controller 40 may vary a current applied to the alternator field coil to thereby adjust the mechanical load applied on the engine during the engine start. The controller may vary the current flow through the field circuit in response to, for example, a number of combustion events since engine start. The controller may further vary the current flow based on barometric pressure, to improve the engine start at higher altitudes. For example, the controller may increase current flow through the alternator field coil circuit as the barometric pressure increases (e.g., at lower altitudes). Similarly, the controller may decrease current flow through the alternator field coil circuit as barometric pressure decreases (e.g., at higher altitudes). Adjusting current flow to the alternator field coil via adjusting the average voltage applied to the alternator field coil via the alternator field coil excitation circuit during engine starting allows controller 40 to compensate for lower engine starting torque when less air for combustion is available at higher altitudes. Thus, when the engine is started at higher altitudes the engine starting speed profile can more closely match the engine starting speed profile at sea level where more air is available to increase engine torque. Consequently, the mechanical load provided by the alternator to the engine can be adjusted to account for differences in engine starting torque that may be related to engine air amount during engine start.

Controller 40 can also adjust alternator field current via the alternator field coil excitation circuit for engine wear and other the environmental engine operating conditions including engine temperature, time since engine cranking, and number of combustion events since engine stop. Further, the system of FIG. 6 allows controller 40 to adapt the amount of alternator field current in response to the above environmental conditions and engine conditions which may cause engine speed to deviate from a desired engine speed under some conditions. For example, if the engine is started at a colder temperature and the engine speed is less than the desired engine speed during the engine start, the alternator field current can be adjusted (e.g., decreased) so that engine speed increases. The amount of current adjustment can be saved to memory and used during a subsequent engine restart at similar conditions.

In still further examples, the controller may adjust the current flow through the alternator field coil circuit during an engine stop to control the engine position. By improving the accuracy of the engine stop position, a subsequent engine restart may be improved.

In one example, the system of FIG. 6 operates to control alternator field coil current by controller 40 outputting a voltage that corresponds to a desired alternator torque load. The desired alternator torque load may be empirically determined and indexed via a table or function in response to engine operating conditions. For example, the alternator torque load can be determined from indexing a table according to engine temperature and altitude. The alternator torque command can then be converted to a desired alternator field current determined from a table indexed by the angular velocity of the alternator and the desired alternator torque command. Further, the desired alternator field current may then be converted to a voltage command that is output by controller 40 to the alternator field coil excitation circuit.

Differential amplifier 608 receives the voltage command from controller 40 and compares the voltage to a voltage at field current sense resistor 606. If the voltages match, the output of differential amplifier 608 remains constant. If the voltage from controller 40 is higher than the voltage at resistor 606, differential amplifier increases voltage command to alternator field coil excitation circuit 210. In this example, the alternator field coil excitation circuit adjusts the average voltage applied to the current flow to the base of transistor 604. Since voltage is supplied by DC/DC converter 212 and controlled via alternator field coil excitation circuit 210, the alternator field current may be less affected by changes in the voltage of battery 202.

As previously indicated, in each of the example circuits, switch 218 is open while the engine is shut down and until the line voltage of battery 202 or the armature windings of the stator of alternator 206 rises to a threshold value (such as the voltage of the second battery 402, or the voltage of the DC/DC converter 212) to prevent a decrease in the voltage available to the electrical components coupled to the output of the DC/DC converter. In the depicted configurations, by adding the alternator field coil excitation circuit 210 as an additional load on the power source (e.g., DC/DC converter 212 or a second battery), the alternator field coil current can be maintained more consistently during an engine start to allow more predictable and accurate engine speed control during engine crank and run-up (e.g., a period of increasing engine speed between crank speed and a desired engine idle speed). For example, if the output of DC/DC converter 212 is substantially maintained at 12 volts, the current flow into alternator field coil 208 is more consistent from engine start to engine start. Consequently, the mechanical load applied to the engine via the alternator during a start is more consistent from engine start to engine start so that engine speed is more repeatable. Further, where the current supplied to the alternator field coil can be adjusted as shown in FIG. 6, the mechanical load applied to the engine via the alternator during an engine start can be adjusted to improve the control of engine speed under varying operating conditions (e.g. varying altitude, varying temperature). Thus, alternator field current can be controlled independent of the age and condition of battery 202, as well as independent of engine cranking loads, at least during some conditions.

Now turning to FIG. 7, it shows yet another example circuit 700 of an engine starting system. Herein, in addition to the components previously introduced in FIGS. 2-5, the system may include a differential amplifier 708 to adjust alternator field current to vary the strength of a magnetic field produced by alternator field coil 208.

In the depicted example, transistor 704 configured to adjust a current flow through the field coil circuit. By adjusting alternator field current instead of field voltage the system of FIG. 7 substantially removes a delay caused by the field inductance and improves system response. Transistor 704 may be electrically coupled to a field current sense resistor 706, and may be driven by differential amplifier 708. Differential amplifier 708 may be powered by a power source other than first battery 202. For example, differential amplifier 708 may be powered by DC/DC converter 212 or by a second battery 402 (as shown in the examples of FIGS. 4-5). By varying the current flow through the field coil 208 during an engine start, the mechanical load provided by the alternator to the engine during the engine start may be varied. For example, similar to the system of FIG. 6, a desired engine start speed profile can be commanded by controller 40 to vary a current applied to the alternator field coil to thereby adjust the mechanical load applied on the engine during the engine start. The controller may vary the current flow through the alternator field coil in response to, for example, a number of combustion events since engine start or other operating parameters as described in the disclosure of FIG. 6.

In one example of FIG. 7 operates to control alternator field coil current by controller 40 outputting a voltage that corresponds to a desired alternator torque load. In one example, the desired alternator torque load may be empirically determined and indexed via a table or function in response to engine operating conditions. For example, the alternator torque load can be determined from indexing a table according to engine temperature and altitude. The alternator torque command can then be converted to a desired alternator field current determined from a table indexed by the angular velocity of the alternator and the desired alternator torque command. Further, the desired alternator field current may then be converted to a voltage command that is output by controller 40 to differential amplifier 708.

Differential amplifier 708 receives the voltage command from controller 40 and compares the voltage to a voltage at field current sense resistor 706. Transfer function 710 converts a desired alternator field current to a voltage command. If the voltages match, the output of differential amplifier 708 remains constant. If the voltage from controller 40 is higher than the voltage at resistor 706, differential amplifier increases current flow to the base of transistor 704. When current flow is increased to the base of transistor 704, additional current is allowed to pass through alternator field coil 208 and transistor 704. Since current is supplied by DC/DC converter 210 and controlled via transistor 704, the alternator field current may be less affected by changes in the voltage of battery 202.

As previously indicated, in each of the example circuits, switch 220 is open while the engine is shut down and until the line voltage of battery 202 or the armature windings of the stator of alternator 206 rises to a threshold value (such as the voltage of the second battery 402, or the voltage of the DC/DC converter 212) to prevent a decrease in the voltage available to the electrical components coupled to the output of the DC/DC converter 212. In the depicted configurations, by adding the alternator field coil as an additional load on the power source (e.g., DC/DC converter 212 or a second battery), the current supplied to alternator field coil can be maintained more consistently during an engine start to allow more predictable and accurate engine speed control during engine crank and run-up (e.g., a period of increasing engine speed between crank speed and a desired engine idle speed). For example, if the output of DC/DC converter 212 is substantially maintained at 12 volts, the current flow into alternator field coil 208 is more consistent from engine start to engine start. Consequently, the mechanical load applied to the engine via the alternator during a start is more consistent from engine start to engine start so that engine speed is more repeatable. Further, where the current supplied to the alternator field coil can be adjusted as shown in FIGS. 6 & 7, the mechanical load applied to the engine via the alternator during an engine start can be adjusted to improve the control of engine speed under varying operating conditions (e.g. varying altitude, varying temperature). Thus, alternator field current can be controlled independent of the age and condition of battery 202, as well as independent of engine cranking loads, at least during some conditions.

Control of alternator field current can be expressed with regard to equations that describe alternator operation. The torque on the alternator pulley shaft can be expressed as:

$$T_{shaft} = K_t * I_f * I_{arm}, \quad (1)$$

where $K_t$ is a torque constant for a particular machine (e.g. alternator), $I_f$ is the machine's field current in the alternator rotor, and $I_{arm}$ is the armature current.

Similarly, alternator power output can be expressed as:

$$P_{out} = V_{bat} * I_{arm} \quad (2)$$

where $V_{bat}$ is the voltage of the aging battery (battery 202).

If the alternator is not electrically buffered from the battery, such as in typical engine starting circuits, the alternator field current dynamics can be expressed as:

$$V_{Bplus}=L_f*di_f/dt+R_f*I_f+K*B_{emf}*\omega_{rot} \quad (3)$$

where $V_{Bplus}$ is alternator voltage output, $L_f$ is armature field coil inductance, $di_f/dt$ is the derivative of field current with respect to time, $R_f$ is the field coil resistance, K is a constant relating the size and number of coil windings of the alternator, $B_{emf}$ is the magnetic field B magnitude of the rotor, and $\omega_{rot}$ is rotor angular velocity. As such, when the engine stopped, Equation 3 reduces to:

$$V_{Bplus}=R_f*I_f \quad (4)$$

Thus at engine stop as the aging battery voltage droops, a proportional decrease in field coil current may occur. As can be seen from Equation (3), the entire cranking event may be adversely impacted by the reduced $V_{Bplus}$ resulting in a lower field current during the entire engine shut down and restart event.

In comparison, as shown in the examples of FIGS. 2-7, by adding the alternator field voltage and current as an additional load on the power source, the $V_{Bplus}$ term of equation (3) can be replaced with a power source maintained at a more stable and regulated voltage level that is also not impacted by engine cranking loads. Thus, equation (3) can be rewritten as:

$$V_{Bplus\_controlled}=L_f*dI_f/dt+R_f*I_f+B_{emf}*\omega_{rot} \quad (5)$$

Now, in the examples of FIGS. 2-7, using equations (1) and (5), the alternator load on the engine is better regulated and the alternator power output can be made substantially insensitive to the aging effects of the main battery (202), as well as the associated crank and run-up voltage droop.

Further still, as can be observed from equations (3) and (5), by controlling $I_f$ directly with a current source supply, as shown in FIG. 7, or indirectly as shown in FIG. 6, the engine torque in equation (1) can be controlled in real-time to increase or decrease the alternator shaft torque as needed to obtain the desired engine crank shaft torque and acceleration, and associated NVH characteristics. For example, from equation 1, dynamically increasing/decreasing the field current results in a dynamically increased or decreased engine shaft torque and resulting dynamically increased or decreased armature current for the same engine speed. Thus, by maintaining a consistent alternator field current during an engine start, or by adjusting the alternator field current during the engine start to actively control the load presented by the alternator to the engine, the quality of the engine start (e.g., NVH) can be improved.

Thus, the examples described by FIGS. 1-7 provide for an engine starting system, comprising: an engine; an engine starter; a first battery in electrical communication with the engine starter during an engine start; and an alternator mechanically coupled to the engine, the alternator having a field coil excitation circuit that is electrically buffered from the first battery during an engine start, the field coil excitation circuit in electrical communication with a power source other than the first battery during the engine start. The engine starting system including wherein the power source is a second battery. The engine starting system including wherein the power source is a DC/DC converter configured to electrically buffer the field coil excitation circuit from the first battery during the engine start. The engine starting system including wherein the field coil excitation circuit includes a voltage controller for regulating an alternator field voltage during the engine start. The engine starting system further comprises a controller, the controller including instructions for selectively shutting down the engine during engine idle-stop conditions and selectively restarting the engine during restart conditions. The engine starting system further comprises a switch coupled in parallel to the power source, the field coil excitation circuit electrically buffered from the first battery when the switch is open. The engine starting system including wherein the controller includes further instructions for opening the switch during the engine start, and closing the switch after a voltage at an input of the power source exceeds a threshold voltage or after a predetermined amount of time after engine speed reaches a threshold engine speed. The engine starting system further comprises a diode in a circuit that electrically couples the first battery to the field coil excitation circuit, wherein a cathode of the diode is oriented toward the field coil excitation circuit, and wherein an anode of the diode is oriented toward the first battery, the diode electrically buffering the field coil excitation circuit from the first battery via limiting current flow in a direction from the field coil excitation circuit to the first battery.

The examples of FIGS. 1-7 further include a vehicle system, comprising: an engine that is selectively shut-down during engine idle-stop conditions; a battery; a starter; a DC/DC converter electrically coupled to the battery, the DC/DC converter configured to provide a regulated voltage output; an alternator including an alternator field coil excitation circuit, the alternator field coil excitation circuit electrically coupled to an output of the DC/DC converter during an engine start, the alternator mechanically coupled to the engine; and a controller with computer readable instructions for, during an engine restart from idle-stop conditions, adjusting engine torque via at least one torque actuator. The vehicle system includes wherein the starter is powered by the battery during the engine start. The vehicle system includes wherein an armature of the alternator is in electrical communication with the battery, the battery supplying power to the DC/DC converter, and wherein the alternator field coil excitation circuit is electrically buffered from the battery via the DC/DC converter. The vehicle system includes wherein an output voltage of the DC/DC converter is greater than a voltage of the battery during engine cranking. The vehicle system further comprises a diode in a circuit that electrically couples the battery to the alternator field coil excitation circuit, a cathode of the diode oriented towards the alternator field coil excitation circuit, and an anode of the diode oriented towards the battery, the diode electrically buffering the alternator field coil excitation circuit from the battery by limiting current flow in a direction from the alternator field coil excitation circuit to the battery. The vehicle system further comprises a switch coupled in parallel with the DC/DC converter, the controller including further instructions for, during the engine restart, opening the switch to electrically buffer the alternator field coil excitation circuit from the battery; and following the engine restart, closing the switch to bypass a buffer circuit between the alternator field coil excitation circuit and the battery. The vehicle system including wherein the DC/DC converter is further electrically coupled to one or more auxiliary electrical loads including interior vehicle lighting. The vehicle system further comprises a power steering system electrically coupled to the alternator, the controller including further instructions for controlling a current supplied to the power steering system by the alternator during the engine start.

The examples of FIGS. 1-7 further provide for a system for controlling engine speed during an engine start, comprising: an engine; a first battery in electrical communication with an engine starter during an engine start; an alternator mechanically coupled to the engine, the alternator having a field coil excitation circuit that is electrically buffered from the first battery during an engine start, the field coil excitation circuit in electrical communication with a power source other than the first battery during the engine start; and a controller to vary a strength of a magnetic field produced by a field coil via adjusting an input of the field coil excitation circuit. The system includes wherein the power source is a second battery. The system includes wherein the power source is a DC/DC converter and where the DC/DC converter electrically buffers the field coil from the first battery during the engine start. The system further comprises a circuit to vary the strength of the magnetic field, the circuit including a differential amplifier, and the controller further comprising instructions for varying the alternator field coil voltage during the engine start by adjusting an output of the differential amplifier. The system includes wherein the controller includes instructions for varying the alternator field coil average voltage during the engine start to vary a load provided by the alternator to the engine during the engine start. The system includes wherein the alternator field coil average voltage is adjusted in response to a number of combustion events since engine stop. The system includes wherein the alternator field coil average voltage is further adjusted in response to a barometric pressure or engine wear. The system includes wherein adjusting the alternator field coil average voltage includes decreasing the alternator field coil average voltage applied to the field coil as the barometric pressure increases. The system includes wherein the controller includes further instructions for selectively shutting-down the engine during engine idle-stop conditions and selectively restarting the engine during restart conditions. The system includes wherein the controller includes further instructions for adjusting alternator field coil average voltage during an engine stop to control engine position. The system includes wherein the differential amplifier is powered by the power source other than the first battery, and where the power source other than the first battery is a DC/DC converter. The system further comprises a resistor electrically coupled to the differential amplifier.

In each of the examples, by electrically coupling the alternator field coil to the DC/DC converter (or a second battery), a regulated power output may be ensured to the alternator field coil, thereby buffering the alternator field coil from the effects of battery decay or aging. In this way, with the alternator field coil electrically buffered from the battery via the DC/DC converter (or the second battery), control of a current applied to the alternator field coil may be improved. As such, by improving control of alternator field coil current, a more predictable and controllable load may be applied to engine via the alternator during an engine start. As elaborated in FIGS. 6 & 7, based on engine operating conditions during an engine start, a controller may provide a more consistent amount of load on the engine. Alternatively, to achieve a desired engine start speed profile, the controller may be configured to vary a current applied to the alternator field coil to thereby adjust the mechanical load applied to the engine during the engine start.

Figure 8:
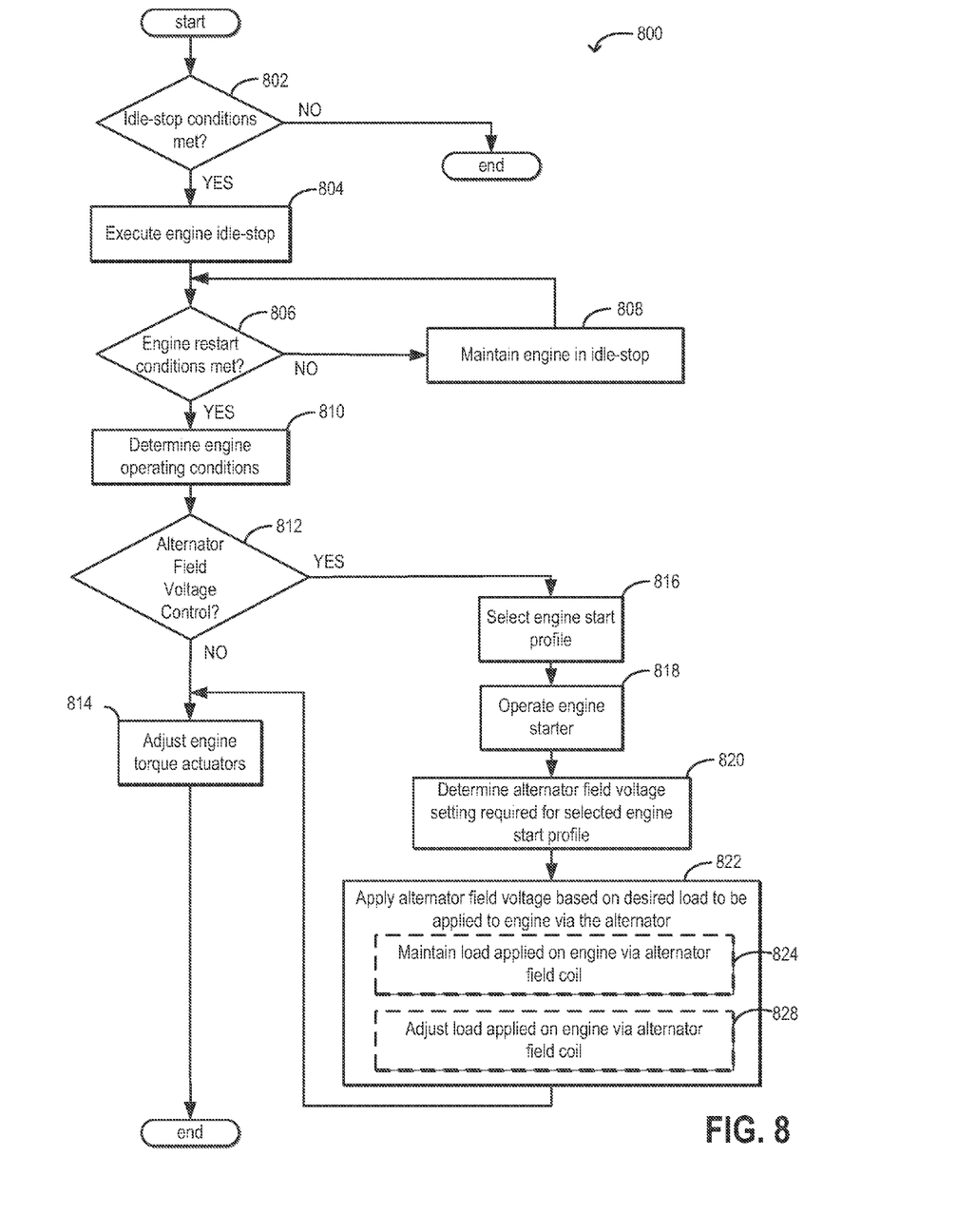
FIG. 8 shows a high level flow chart of a method for applying an alternator load to an engine during an engine start, according to the present disclosure.

Now turning to FIG. 8, an example method 800 is described for selectively shutting down and restarting an engine including the engine starting systems of FIGS. 2-7. Thus, the method of FIG. 8 is suitable for controlling alternator field voltage or current.

At 802, engine idle-stop conditions may be confirmed. These may include, for example, verifying that the engine is operating (e.g., carrying out combustion), the battery state of charge is more than a threshold (e.g. more than 30%), vehicle running speed is within a desired range (e.g., no more than 30 mph), air conditioning is not desired, engine temperature is within a selected temperature range, a start has not been requested by the vehicle driver, driver requested torque is less than a predetermined threshold value, brake pedal has been pressed, etc. As such, any or all of the idle-stop conditions may be met for an idle-stop condition to be confirmed.

If idle-stop conditions are not met, the method may end. However, if any or all of the idle-stop conditions are met, then at 804, the controller may initiate execution of an idle-stop operation and proceed to deactivate the engine. As such, this may include shutting off fuel and/or spark to the engine. Further, during engine stopping, current supplied to the alternator field coil can be adjusted to control engine position at stop. For example, if engine speed is approaching zero and engine position is near a desired stopping position, field current supplied to the alternator field coil can be increased so that the engine stops more quickly near the desired engine stopping position. On the other hand, if engine speed is approaching zero and engine speed is away from a desired engine stopping position, alternator field current can be decreased so that the engine rotates for a longer period of time so that the engine stops closer to the desired engine position.

At 806, restart conditions may be confirmed. These may include, for example, verifying that the engine is in idle-stop (e.g., not carrying out combustion), the battery state of charge is less than a threshold (e.g. less than 30%), vehicle running speed is within a desired range (e.g., less than 30 mph), air conditioning is desired, a start has not been requested by the vehicle driver, driver requested torque is more than a predetermined threshold value, brake pedal has been released, etc. If restart conditions are not met, then at 808, the engine may then be maintained in idle-stop until restart conditions are satisfied.

If restart conditions are met, engine operating conditions (e.g., engine speed, driver demanded torque, battery voltage, barometric pressure, etc.) may be determined at 810. Engine operating conditions may be determined via sensors or calculations.

At 812, method 800 judges whether or not alternator field voltage or current is to be dynamically controlled during an engine start. Alternator field voltage can be adjusted via an alternator field coil excitation circuit (e.g., as discussed in FIGS. 2-6) while alternator field current can be adjusted via a current control transistor (e.g., FIG. 7) or by adjusting the alternator field coil excitation circuit in response to sensed current and a voltage command that represents a alternator field coil current (e.g., FIG. 6). If so, method 800 proceeds to 816. If not, the alternator field voltage command is set to a constant and controlled by the alternator field coil excitation circuit such as 210 of FIGS. 2-5 and method 800 proceeds to 814.

At 814, method 800 adjusts an engine torque actuator to control engine torque during an engine start. Thus, engine speed is controlled during an engine start via engine torque actuators and via current supplied by to an alternator field coil by a substantially constant voltage source. In some examples, an engine torque actuator may be a throttle. In other examples, an engine torque actuator may be spark timing or fuel injection timing. In other examples, a combination of torque actuators selected from a group of torque actuators including fuel injection, spark advance, and throttle may be adjusted to provide the desired engine speed. Method 800 exits after engine torque actuators are adjusted.

At 816, based on the engine operating conditions, an engine starting profile may be selected. In one example, the engine start profile is an engine start speed profile. The engine start speed profile may be based on time or number of combustion events. For example, the engine start speed profile may be a function that outputs an engine speed for each engine cylinder combustion event up to a specified number of combustion events. Similarly, the engine start speed profile may be a function that outputs an engine speed at specified times during an engine start. The start profile is the load the alternator provides to the engine during an engine start. At 818, an engine starter, powered by a system battery, may be operated to start the engine.

At 820, an alternator field coil current or voltage setting required to achieve the selected engine start profile may be determined. In one example, an alternator field coil current or voltage profile may be determined based on the selected engine start profile. For example, at a first engine cylinder combustion event the alternator field coil current or voltage profile may call for 2.0 amps alternator field coil current or 6 volts. At a fifth engine cylinder combustion event the alternator field coil current profile may call for 2.2 amps alternator field coil current or 6.5 volts. Similar alternator field current or voltage commands may be issued at predetermined times during an engine start. In this way, the alternator field current or voltage is controlled by a feed forward current or voltage command.

At 822, an alternator field coil input current or voltage may be applied to the alternator field coil. The input field current or voltage corresponds to a desired load that the alternator applies to the engine via the alternator rotor shaft. To apply the alternator field coil input current or voltage, in one example, a controller 40 may output a voltage that corresponds to a desired alternator field current or voltage (e.g., see controller 40 and amplifier 608 of FIG. 6). Further, the voltage output by controller 40 can adjust for changes in engine torque that are related to altitude. For example, controller 40 can reduce alternator field current or voltage when the engine is operated at higher altitudes where less air is available to engine cylinders during a start. In other examples, where alternator field current or voltage is not directly controlled by a controller voltage output, the output voltage of the DC/DC converter 212 and the impedance of alternator field coil 208 determine alternator field current.

Applying a desired load to the engine via the alternator may include, for example, at 824, substantially maintaining an alternator field voltage to control a mechanical load applied to the engine via the alternator. As such, this may include substantially maintaining a voltage applied to the alternator field coil at a substantially constant value during an engine start. Method 800 proceeds to 814 after 824 if a constant voltage is applied to the alternator field coil without alternator field current control.

In another example, at 828 applying a desired load to the engine via the alternator may include adjusting a load applied on the engine via an alternator by adjusting the alternator field coil current or voltage. As such, this may include varying a current or voltage applied to the alternator field coil to control engine speed during the engine start.

In one example, the controller may monitor the actual engine start profile and based on a deviation of the monitored engine start profile from the desired start profile, the controller may adjust an alternator field coil current or voltage, thereby adjusting a load applied on the engine. In another example, the field coil current or voltage may be varied in response to a number of combustion events since engine start. In another example, the field coil current or voltage may be further adjusted in response to alternator angular velocity. The field coil current or voltage may be still further adjusted in response to barometric pressure. The variation may include, for example, increasing the current or voltage applied as the barometric pressure increases.

While adjusting a load applied to the engine via the alternator, a current or voltage supplied by the alternator armature windings to an auxiliary system, such as a power steering system, may also be controlled during the engine start. For example, alternator field current or voltage can be increased at a time that is desirable to provide increased power steering assist to the driver. As such, this may improve the power steering system's response time. Method 800 proceeds to 814 after 828 if alternator field coil current or voltage control is implemented.

In this way, by electrically buffering an alternator field coil from a system battery used to crank the engine via a power source (such as a DC/DC converter or a second system battery), the alternator field coil may be less influenced by voltage droop and associated field coil current variation arising from battery aging or decay during an engine start. By enabling an alternator field coil excitation circuit input voltage or alternator field coil current to be controlled during an engine start, an alternator mechanical load applied to an engine during an engine start may be better controlled. Accordingly, controlling engine speed during starting can be improved.

Thus, the method of FIG. 8 provides for a method of controlling engine speed, comprising: during an engine start, electrically buffering a field coil of an alternator from a battery supplying power to an engine starter; and varying an electrical property supplied to the field coil to control engine speed during the engine start, the electrical property supplied to the field coil supplied via a substantially constant voltage source. The method includes wherein the electrical property is a current or an average voltage. The method includes wherein the electrical property is further varied in response to a barometric pressure, varying the electrical property including increasing the electrical property applied to the alternator field coil as the barometric pressure increases. The method further comprises controlling a current supplied by the alternator to a power steering system during the engine start. The method includes wherein electrically buffering the field coil includes opening a switch to avoid bypassing a DC/DC converter configured to provide a regulated voltage output to the field coil.

The method of FIG. 8 also includes a method of operating an engine, comprising: during an engine start, adjusting an electrical property supplied to an alternator field coil in response to a selected engine start speed profile, wherein the alternator field coil is electrically coupled to an output of a DC/DC converter during the engine start, the DC/DC converter powered at least in part via a battery, the alternator field coil electrically buffered from the battery via the DC/DC converter. The method including wherein the electrical property supplied to the alternator field coil is a voltage and wherein the electrical property is further adjusted in response to alternator angular velocity. The method including wherein the electrical property supplied to the alternator field coil is a current and wherein the current supplied to the alternator field coil is adjusted via a transistor, and where the transistor is controlled via a differential amplifier.

The method of FIG. 8 also includes a method of controlling a vehicle system including an engine that is selectively shutdown during engine idle-stop conditions, comprising: during an engine start, electrically buffering an alternator field coil excitation circuit of an alternator from a battery supplying power to a starter; and maintaining an alternator field coil excitation circuit input voltage to control a load applied to the engine via an alternator rotor. The method further comprises bypassing the electrical buffering of the field coil excitation circuit of the alternator after a voltage at the battery is greater than a threshold voltage. The method including wherein maintaining the alternator field coil excitation circuit input voltage includes maintaining the alternator field coil excitation input voltage via a DC/DC converter. The method including wherein the electrical buffering is via a switch.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific examples are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
during an engine restart from an idle-stop,
adjusting an electrical property supplied to an alternator field coil in response to a selected engine start speed profile, wherein the alternator field coil is electrically coupled to an output of a DC/DC converter during the engine start, the DC/DC converter powered at least in part via a battery, the alternator field coil electrically buffered from the battery via the DC/DC converter.

2. The method of claim 1, wherein the electrical property supplied to the alternator field coil is a voltage and wherein the voltage is further adjusted in response to alternator angular velocity.

3. The method of claim 1, wherein the electrical property supplied to the alternator field coil is a current and wherein the current supplied to the alternator field coil is adjusted via a transistor, and where the transistor is controlled via a differential amplifier.

4. A system for controlling engine speed during an engine start of a vehicle, comprising:
an engine coupled to an automatic transmission of the vehicle;
a first battery in electrical communication with an engine starter during an engine start;
an alternator mechanically coupled to the engine, the alternator having a field coil excitation circuit that is electrically buffered from the first battery during the engine start, the field coil excitation circuit in electrical communication with a power source other than the first battery during the engine start; and
a control system having non-transitory instructions stored in memory to vary a strength of a magnetic field produced by a field coil via adjusting a voltage or current supplied to the field coil excitation circuit responsive to inputs received from the engine, and to automatically stop and restart the engine during idle-stop conditions.

5. The system of claim 4, wherein the power source is a second battery.

6. The system of claim 4, wherein the power source is a DC/DC converter and where the DC/DC converter electrically buffers the field coil from the first battery during the engine start.

7. The system of claim 4, further comprising a circuit to vary the strength of the magnetic field, the circuit including a differential amplifier, and the controller further comprising instructions for varying alternator field coil average voltage during the engine start by adjusting an output of the differential amplifier.

8. The system of claim 4, wherein the controller includes instructions for varying alternator field coil average voltage during the engine start to vary a load provided by the alternator to the engine during the engine start.

9. The system of claim 8, wherein the alternator field coil average voltage is adjusted in response to a number of combustion events since engine stop.

10. The system of claim 9, wherein the alternator field coil average voltage is further adjusted in response to a barometric pressure or engine wear.

11. The system of claim 10, wherein adjusting the alternator field coil average voltage includes decreasing the alternator field coil average voltage applied to the field coil as the barometric pressure increases.

12. The system of claim 8, wherein the controller includes further instructions for selectively shutting-down the engine during engine idle-stop conditions and selectively restarting the engine during restart conditions.

13. The system of claim 8, wherein the controller includes further instructions for adjusting the alternator field coil average voltage during an engine stop to control engine position.

14. The system of claim 7, where the differential amplifier is powered by the power source other than the first battery, and where the power source other than the first battery is a DC/DC converter.

15. The system of claim 7, further comprising a resistor electrically coupled to the differential amplifier.

16. A method of controlling engine speed, comprising:
during an engine restart from an automatic engine idle-stop,
electrically buffering a field coil of an alternator from a battery supplying power to an engine starter; and
varying an electrical property supplied to the field coil to control engine speed during the engine start responsive to inputs received at a controller from an engine, the electrical property supplied to the field coil supplied via a substantially constant voltage source.

17. The method of claim 16, wherein the electrical property is a current or an average voltage.

18. The method of claim 17, wherein the electrical property is further varied in response to a barometric pressure, varying the electrical property including increasing the electrical property applied as the barometric pressure increases.

19. The method of claim 16, further comprising, controlling a current supplied by the alternator to a power steering system during the engine start.

20. The method of claim 16, wherein electrically buffering the field coil includes opening a switch to avoid bypassing a DC/DC converter configured to provide a regulated voltage output to the field coil.

* * * * *